(12) United States Patent
Bak et al.

(10) Patent No.: US 9,189,972 B2
(45) Date of Patent: *Nov. 17, 2015

(54) VISUALIZING THE MOOD OF A GROUP OF INDIVIDUALS

(71) Applicant: International Business Machines Corporation, Armonk, NY (US)

(72) Inventors: Peter Bak, Haifa (IL); Stephan Fong-Jau Jou, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/223,003

(22) Filed: Mar. 24, 2014

(65) Prior Publication Data

US 2014/0205977 A1    Jul. 24, 2014

Related U.S. Application Data

(63) Continuation of application No. 13/646,271, filed on Oct. 5, 2012.

(51) Int. Cl.
*G09B 19/00* (2006.01)
*G06K 9/00* (2006.01)
(Continued)

(52) U.S. Cl.
CPC *G09B 19/00* (2013.01); *G06K 9/00* (2013.01); *G06T 11/00* (2013.01); *G06T 11/206* (2013.01)

(58) Field of Classification Search
CPC ............. H04M 3/457; H04M 2250/62; G06F 2203/011; G06F 17/30265

USPC ......................................................... 434/236
See application file for complete search history.

(56) References Cited

U.S. PATENT DOCUMENTS 6,882,971 B2 *   4/2005   Craner .......................... 704/246
2008/0195980 A1   8/2008   Morris
(Continued)

FOREIGN PATENT DOCUMENTS

RU        2010109576 A      9/2011

OTHER PUBLICATIONS

Kernchen et al., "Context-Awareness in MobiLife," found at http://battestini.net/blog/wp-content/uploads/2006_IST_ContextAwarenessInMobilife.pdf, 2006, 5 pp.
(Continued)

*Primary Examiner* — Timothy A Musselman
(74) *Attorney, Agent, or Firm* — Shumaker & Sieffert, P.A.

(57) ABSTRACT

Techniques are described for visualizing the mood of a group of individuals. In one example, a graphical display is divided into regions representing different emotions. Input indicative of an emotion is received from individuals located in an area of interest. As the input is received, a set of indicators is output in each of the regions of the graphical display. Each indicator represents a different one of the individuals who is experiencing the emotion associated with the region in which the indicator is displayed and is displayed with a color assigned to the emotion. The indicators are animated to move over time toward a center of the graphical display and are removed upon reaching the center of the graphical display. In this way, the graphical display depicts a current mood for the group and indicates a rate of change of each of the different emotions.

9 Claims, 5 Drawing Sheets

(51) Int. Cl.
*G06T 11/00* (2006.01)
*G06T 11/20* (2006.01)

(56) References Cited

U.S. PATENT DOCUMENTS

2010/0099955 A1 4/2010 Thomas et al.
2013/0152000 A1 6/2013 Liu et al.

OTHER PUBLICATIONS

MobiLife goes Mobile!, found at http://www.ist-mobilife.org/, 2006, 1 p.
Kemvar, Sep and Jonathan Harris, "We Feel Fine and Searching the Emotional Web", found at http://www.wefeelfine.org/wefeelfine.pdf, ACM 2011, 11 pgs.
MoodJam Research Group, "MoodJam" found at http://www.moodjam.org/help, 2006.
Mood Stats, available at http://mood-stats.en.softonic.com/palm, 2007.
"MoodStats for Cuban Council, c. 2000", available at http://www.cubancouncil.com/work/project/moodstats, 2006, 9 pgs.
"We Feel Fine—Methodology", available at http://www.wefeelfine.org/methodology.html, 2006.
"We Feel Fine—Feelings" available at http://www.wefeelfine.org/data/files/feelings.txt, 2006.
"We Feel Fine—Movements" available at http://www.wefeelfine.org/movements.html, 2006.
Office Action from U.S. Appl. No. 13/646,271, dated Apr. 16, 2014, 6 pp.
Amendment in Response to Office Action mailed Oct. 23, 2014, from U.S. Appl. No. 13/646,271, filed Jan. 22, 2015, 9 pp.
Office Action from U.S. Appl. No. 13/646,271, dated Oct. 23, 2014, 8 pp.
Final Office Action from U.S. Appl. No. 13/646,271, dated May 21, 2015, 5 pp.
Notice of Allowance from U.S. Appl. No. 13/646,271, dated Jul. 8, 2015, 5 pp.

\* cited by examiner

VISUALIZING THE MOOD OF A GROUP OF INDIVIDUALS

This application is a continuation of U.S. patent application Ser. No. 13/646,271 filed Oct. 5, 2012, the entire contents of which is incorporated by reference.

BACKGROUND

Sentiment analysis is an emerging area of social analytics technology that is being used pervasively by analytical solutions. To that end, various systems have been described for capturing and visualizing the mood of an individual. That is, the systems attempt to display a visualization of the current emotional mood or state of mind of an individual or perhaps group of people.

For example, one example type of system attempts to analyze Internet blogs in social networking sites in order to extract sentences and other information that provide an indication of an individuals emotions along with demographic and location information for that user. These systems attempt to apply natural language processing to classify the information into specific sentiments and create a visualization that presents a colorful interface showing a user's emotion by way of dots, where each dot represents a sentence with its color representing that sentiment. For example, a sentence indicative of a happy feeling may be presented in bright yellow or a sentence indicative of an angry feeling may be represented in red. These types of systems often tend to be inaccurate in that mood information must be indirectly inferred from textual analysis of sentences. Due to the ambiguous nature of language, the systems tend to incorrectly classify sentences and, as a result, misrepresent the mood of the individual. Moreover, the systems do not provide any ability to view the mood of an individual relative an overall mood of a group of individuals.

In other examples, some systems allow users to record their moods from a set of possible moods. The system presents the visualization data for a single user as a page filled with colored horizontal strips, where the length of a strip corresponds to the duration of an individual's mood over time. Visualizations of the moods for users can be shared with others and recent moods are posted on a main software page. These systems also do not provide any ability to view the mood of an individual relative an overall mood of a group of individuals nor depict the dynamics within an overall mood of a group of users.

SUMMARY

Techniques are described for directly visualizing the mood of a group of individuals. The group of individuals may be located in the same proximate location and may interact with a visualization control system through one or more physical input devices. For example, the techniques may be used to provide a current, real-time visualization of the current emotional mood or state of mind of a group of people, such as a people within a city, attendees of an event or any set of individuals.

In one example, a device comprises an interface to receive input from each of a plurality of individuals, wherein the input received from each of the individuals is indicative of an emotion of the individual from which the input was received. A processor executes software program code to generate a graphical display having a plurality of regions, each of the regions representing a different one of a plurality of emotions. As the input is received, the software program code outputs a set of indicators in each of the regions of the graphical display, each of the indicators representing a different one of the individuals who is experiencing the emotion associated with the region in which the indicator is displayed and is displayed with a color assigned to the emotion. The software program code animates the indicators to move the indicators within the regions and removes the indicators after a time duration to depict a current mood for the individuals.

In another example, a method comprises generating a graphical display having a plurality of regions, each of the regions representing a different one of a plurality of emotions. The method further comprises receiving input from each of a plurality of individuals. The input received from each of the individuals is indicative of an emotion of the individual from which the input was received. The method includes, as the input is received, outputting a set of indicators in each of the regions of the graphical display, wherein each of the indicators represents a different one of the individuals who is experiencing the emotion associated with the region in which the indicator is displayed and is displayed with a color assigned to the emotion, and animating the indicators to move the indicators within the regions and removing the indicators after a time duration to depict a current mood for the individuals.

In another example, a computer-readable storage medium storing software instructions to cause a programmable processor to generate a graphical display having a plurality of regions, each of the regions representing a different one of a plurality of emotions. The instructions further cause the processor to receive input from each of a plurality of individuals, wherein the input received from each of the individuals is indicative of an emotion of the individual from which the input was received and, as the input is received, output a set of indicators in each of the regions of the graphical display, wherein each of the indicators represents a different one of the individuals who is experiencing the emotion associated with the region in which the indicator is displayed and is displayed with a color assigned to the emotion. The instructions further cause the processor to animate the indicators to move the indicators within the regions and removing the indicators after a time duration to depict a current mood for the individuals.

The techniques may provide one or more advantages. For example, unlike conventional systems that visualize only individual moods, the techniques may be used to directly visualize a mood of individuals within a potentially large group of individuals in any specified location, area of interest or other setting. That is, the techniques provide for a visualization of each individual's mood in the context of the overall group of individuals. Moreover, the techniques need not to rely on natural language processing and result in a much more directed and accurate visualization of the mood of the group. In addition, the visualization techniques make use of characteristics, such as color and animation, in a way that depicts rapid information with respect to the relative number of individuals that are experiencing each different mood.

The details of one or more aspects of this disclosure are set forth in the accompanying drawings and the description below. Other features, objects, and advantages of the disclosure will be apparent from the description and drawings, and from the claims.

DETAILED DESCRIPTION

Figure 1:
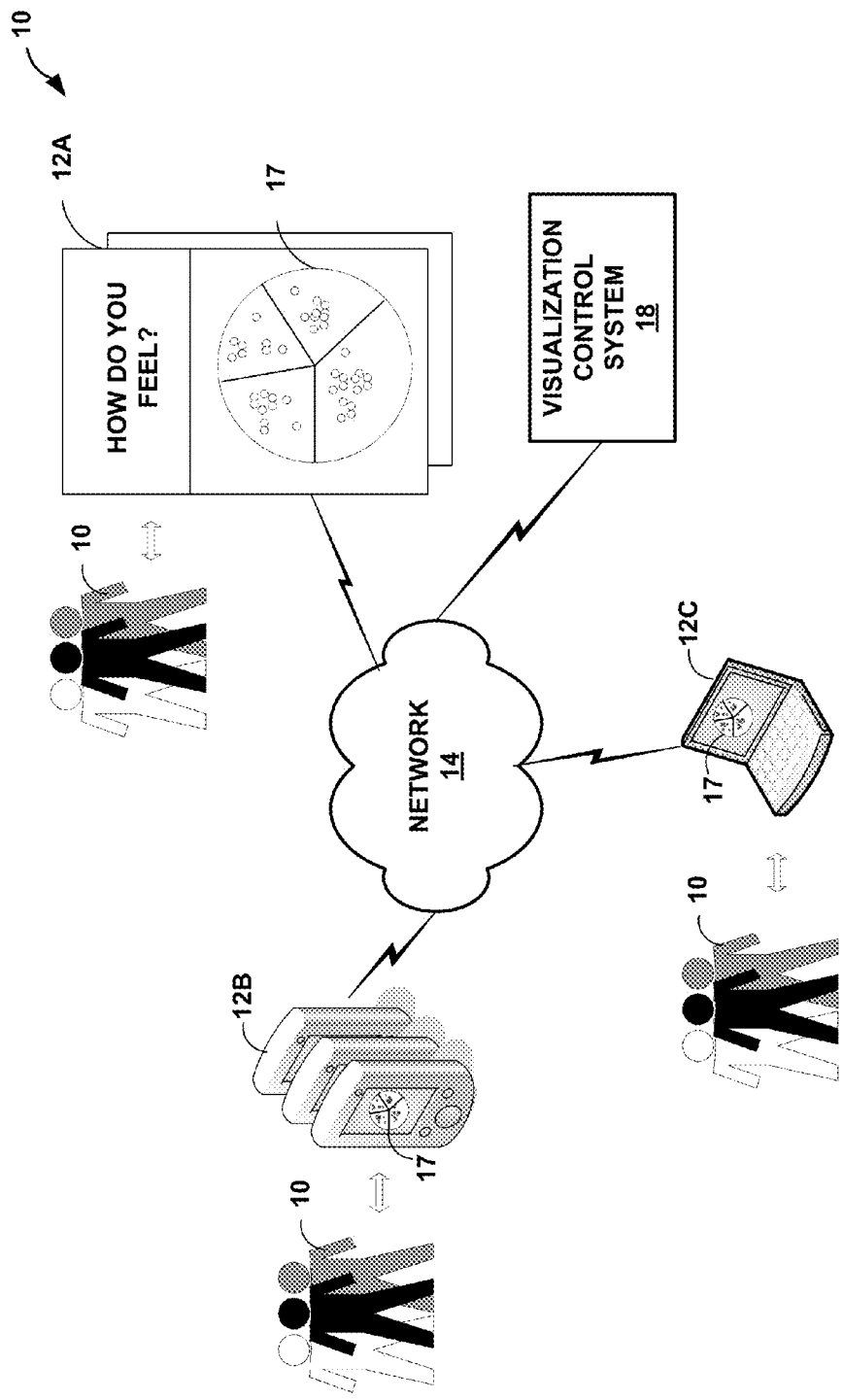
FIG. 1 illustrates an example computing environment in which a plurality of individuals interacts with sensors to provide input indicative of their moods.

FIG. 1 illustrates an example computing environment 10 in which a plurality of individuals 10 interact with sensors 12 to provide input indicative of their moods. As shown in the example of FIG. 1, sensors 12 may comprise a variety of different devices. For example, sensors 12A may be touch-enabled, interactive electronic signs positioned throughout a specific geographic location or region, such as a cite, or at an event, such as a sporting event, political rally, customer training session or focus groups, online forums, product launches, seminars, campuses and the like. Sensors 12 may take other forms, such as smart phones 12B or computing devices 12C. Input provided by individuals 10 is communicated to visualization control system 18 by way of network 14. As described herein, visualization control system 18 processes the input from the users to generate a visualization of the overall mood of individuals 10 and presents a graphical display 17 on output devices, which may include sensors 12A-12C and/or additional output devices.

In one example, visualization control system 18 generates the graphical display in a unique manner in which graphical display 17 is divided into a plurality of regions, where each of the regions corresponds to a different mood. Visualization control system 18 collects real-time input from individuals through sensors 12 and codes the information, e.g., in both color and movement. Individuals 10 interact with sensors 12 to provide an indication of his or her current mood. For example, individuals 10 may make a selection from a set of available moods, e.g. by way of a touch input. In response to the selected mood, visualization control system 18 updates graphical displays 17 to produce a visualization of the mood of the group of individuals 10. In general, the group of individuals 10 represents a plurality of individuals, i.e., at least two individuals.

Upon receiving new input from one of individuals 10, visualization control system 18 updates displays 17 to depict a corresponding indicator, such as a circle, within one of the regions associated with that particular emotion. New entries may be highlighted, such as with a white boarder of a colored circle, until the next entry is received. Over time, the regions associated with the different needs are essentially filled up with the entries as data indicative for those moods is received. In one example, visualization control system 18 updates the display over time so that the entries are continuously moved with a representative speed toward a center of display and then disappear, i.e., removed from display 17. In this example, the frequency at which new entries for a particular emotion are displayed and the speed at which those entries move toward the centers of display 17 may be indicative of a rate at which input is being received for that particular emotion. Changes in the speed and the rate at which entries appear provide a visual indication for changing or shifting a mood of a group of individuals 10.

In this way, unlike conventional systems that visualize only individual moods, visualization control system 18 updates graphical displays 17 to produce a visualization of a mood of individuals 10. That is, visualization control system 18 updates graphical displays 17 to provide a visualization of each individual's mood in the context of the overall group of individuals. In some examples, visualization control system 18 constructs the visualization based on direct user input and need not rely on natural language processing and, therefore, provides a much more directed and accurate visualization of the mood of users 10. As described in further detail below, visualization control system 18 map construct graphical displays 17 to make use of characteristics, such as color and animation, in a way that depicts rapid information with respect to the relative number of individuals 10 that are experiencing the different moods.

Although described with respect to a computing environment 10 in which visualization control system 18 interacts with a plurality of distributed sensors, the techniques described herein may be applied by one or more stand-alone sensors with internal control systems that operation in accordance with the techniques described herein.

Figure 2A:
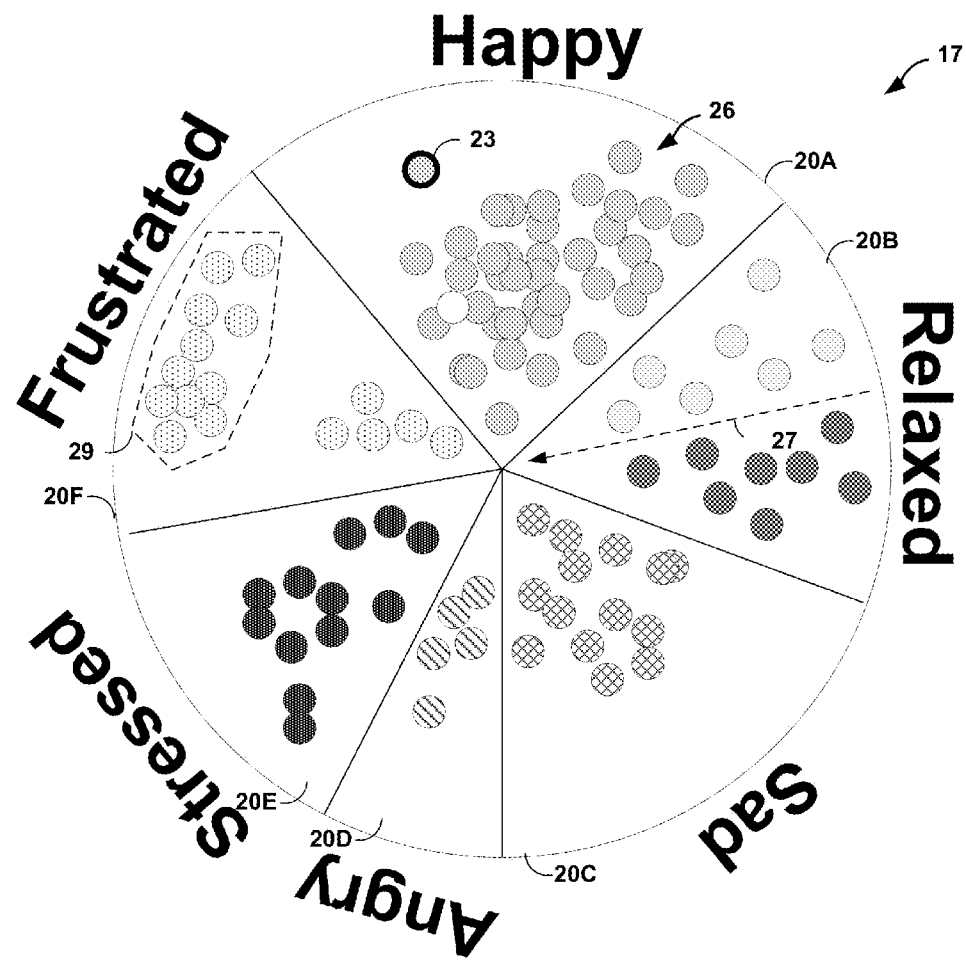
FIG. 2A illustrates an example graphical display generated by the visualization control system of FIG. 1 to provide a visualization of the current and changing mood of a group of individuals.

FIG. 2A illustrates an example graphical display 17 generated by visualization control system 18 to provide a visualization of the current and changing mood of a group of individuals. In this example, visualization control system 18 presents a graphical display that has been divided into a plurality of regions 20A-20F. Each of the regions corresponds to a different emotion. For example, in graphical display 17 in FIG. 2A, the graphical display has been divided into a plurality of pie-shaped regions 20A-20F that corresponds to emotions: happy, relaxed, sad, angry, stressed and frustrated, respectively. In the example of FIG. 2A, each of regions 22 includes a set of indicators 26 that each represent a different one of individuals 10 from which input has been received indicating that the particular individual is experiencing the emotion associated with the region 20 in which the indicator is displayed.

In one example, each of indicators 26 is displayed with a color or other graphical characteristic that is assigned to the emotion. As input is received from an individual within the geographical location of interest, visualization control system 18 generates a new indicator within a corresponding one of regions 20 that is associated with the emotion that the user has indicated that he or she is experiencing. In the example of FIG. 2A, a new indicator 23 has been displayed by visualization control system 18 within region 20A that is associated with the emotion happy. As shown in FIG. 2A, new indicator 23 is highlighted with a ring graphically generated and displayed around the indicator to show that the indicator is the most recently received input from any user of the group.

Visualization control system 18 determines a time duration for which the entries are displayed within each region 22 before being removed. In one example, visualization control system 18 controls the time duration that an entry is displayed within a given region 22 as a function of a frequency at which entries for that particular emotion are received. Further, in one example, visualization control system 18 updates display 17 to animate indicators 26 so that each of the indicators travels from an exterior of the display to the center and is removed from the display upon reaching the center. Visualization control system 18 computes and control a rate at which each indicator 26 travels within each of regions 22 along a direction 27 to the center as a function of the frequency at which entries for that particular motion are received. In this way, the speed at which indicators 26 are travelling within each region 20 and being removed from display 17 provides a visual indication of the differences visualization control system 18 is receiving input from individuals 10 experience each corresponding emotion. For example, the faster in which entries are received for a given emotion causes visualization control system 18 to move corresponding indicators 26 faster toward the center of the display. Similarly, regions in which indicators 26 drift slowly toward the center provide a visual indication that few individuals 10 are submitting new entries indicative of that particular emotion. The speed of the movement and fading may be adjusted dynamically by visualization control system 18 based on the frequency of the votes (input), to ensure that there is always some activity being visualized. As such, visualization control system 18 provides immediate and direct visual feedback of the rate at which entries indicating the corresponding mood are received.

Further, in some examples, visualization control system 18 computes and controls in real-time the area of each region to visually depict the popularity of each emotion. In this example, graphical display 20 indicates that nearly twice the number of individuals 10 are feeling happy relative to the number of users feeling frustrated in that the area of region 20A is approximately twice that of region 20F. In addition the cluster of the indicators provides an indication of temporal aspect associated with the emotions. For example, cluster 29 of indicators 26 within region 20F indicates that more users felt frustrated more recently within the overall time duration represented by region 20F.

In this way, visualization control system 18 generates and updates display 17 so as to provide information in color and movement. As one example, a simple, fixed set of colors and quadrant positioning may be used to allow rapid information about the relative numbers of individuals that are feeling a specific mood. Moreover, as described, the velocity of the individual dots to the center and the rate of appearance of new dots provides a sense of the rate of change for a given mood; e.g. providing a visualization of how quickly a group is becoming happy, versus how quickly the group is becoming sad.

Figure 2B:
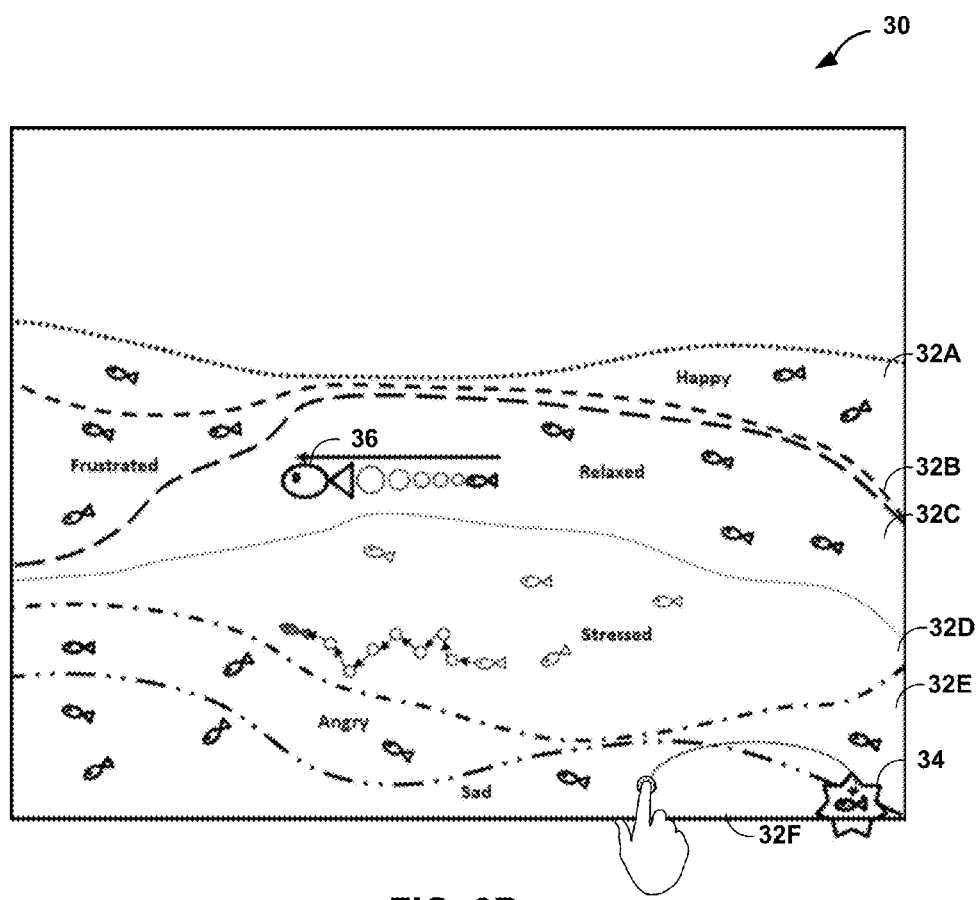
FIG. 2B illustrates another example of graphical display that may be generated by the visualization control system of FIG. 1 to provide a visualization of the current and changing mood of a group of individuals.

FIG. 2B illustrates another example of a graphical display 30 that visualization control system 18 may generate to provide a visualization of the current and changing mood of a group of individuals. In this second example, like graphical display 17 in FIG. 2A, visualization control system 18 presents a graphical display that has been divided into a plurality of regions 30A-30F, each corresponding to a different emotion. However, in the example of FIG. 2A, graphical display 30 utilizes a river metaphor in which the river comprises a plurality of water bands that dynamically vary as input is received for the corresponding emotion. Each of regions 32 includes a set of indicators, shown as fish in this example, that each represent a different one of individuals 10 from which input has been received indicating that the particular individual is experiencing the emotion associated with the region 32 in which the indicator is displayed.

In one example, each of the indicators as well as the region (water level) may be displayed with a color or other graphical characteristic that is assigned to the emotion. In this example, input is received from an individual within region 32F, causing visualization control system 18 to generate a new indicator 34. In one example, touching of an existing fish by a user may cause visual control system 18 to enlarge or otherwise animate the fish (e.g., fish 36), thereby allowing the users to show engagement, passion or otherwise significance of a mood.

Visualization control system 18 updates display 30 over time so that the fish indicators appear to visually "swim" through the water (e.g., right to left) with a representative speed over a time duration and then disappear upon reaching an edge of display 30. Thus, the frequency at which new entries for a particular emotion are displayed and the speed at which the corresponding indicators move may be indicative of a rate at which input is being received for that particular emotion. Changes in the speed and the rate at which entries appear provide a visual indication for changing or shifting a mood of a group of individuals 10. Moreover, visualization control system 18 may dynamically control a height of each water band (region 32) to provide a visualization of entries collected for each mood over time.

Figure 3:
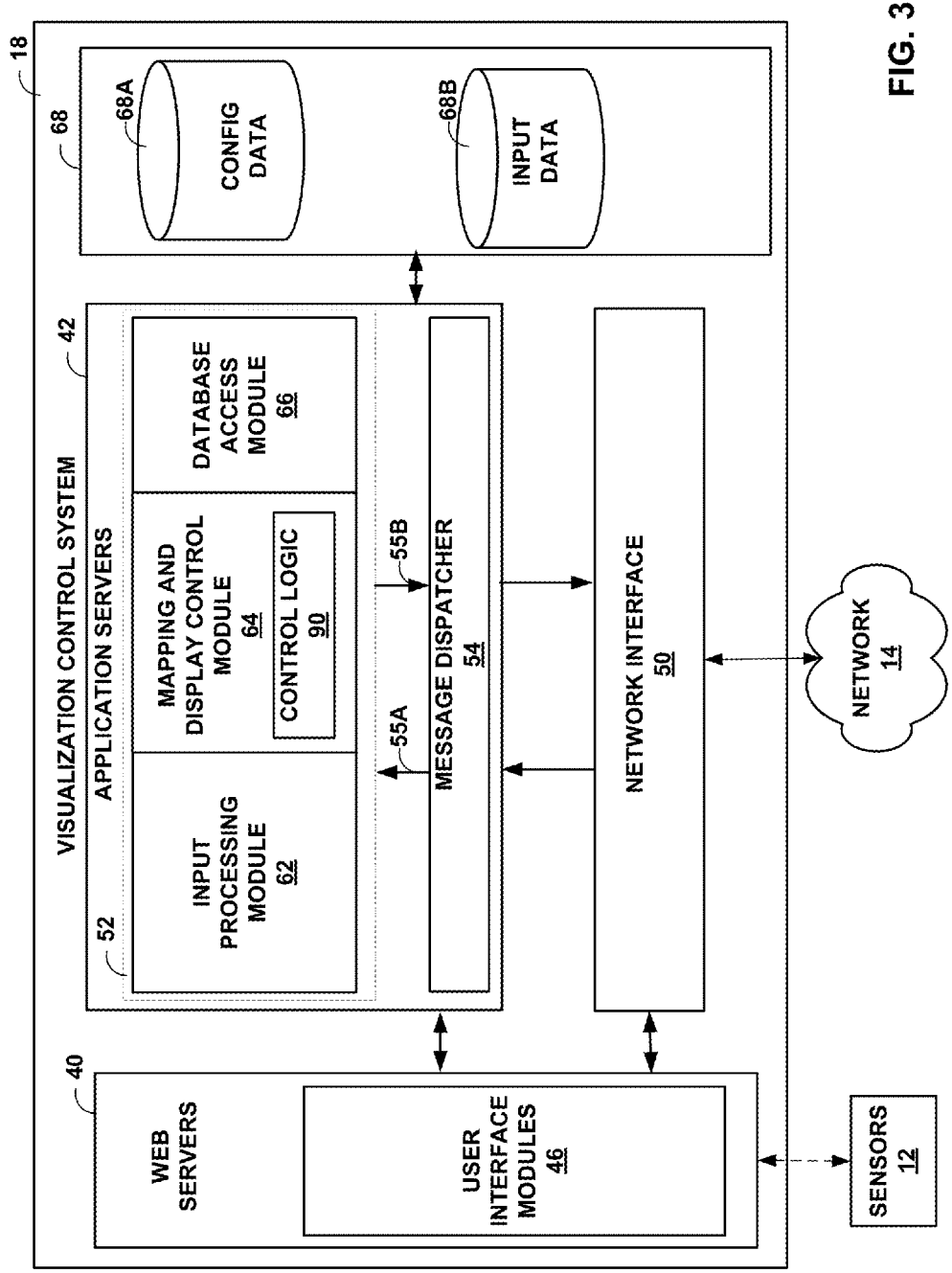
FIG. 3 is a block diagram illustrating further details of one example implementation of visualization control system illustrated in FIG. 1.

FIG. 3 is a block diagram illustrating further details of one example implementation of visualization control system 18 illustrated in FIG. 1. In general, visualization control system 18 includes one or more computing devices (e.g., computing servers that provide operating environments for various software modules). These servers can generally be categorized as web servers 40, application servers 42 and database servers 44. Although these servers are illustrated separately in FIG. 3, visualization control system 18 may, in various implementations, be realized by a single computing device, or a plurality of cooperating computing devices, as the case may be.

Web servers 40 provide an interface by which one or more users, e.g., individuals 10, administrators, or other users, communicate with visualization control system 18 via network 14. In one configuration, web servers 40 execute web server software (such as software marketed by Microsoft® Corporation under the trade designation "INTERNET INFORMATION SERVICES" or formerly under the trade designation "INTERNET INFORMATION SERVER"). As such, web servers 40 provide an environment for interacting with remote individuals 15 according to user interface modules 46, which can include Active Server Pages, web pages written in hypertext markup language (HTML) or dynamic HTML, Active X modules, Lotus scripts, Java scripts, Java Applets, Distributed Component Object Modules (DCOM) and the like.

Although illustrated as "server side" software modules executing within an operating environment provided by web servers 40, user interface modules 46 could readily be implemented as "client-side" software modules executing on computing devices, such as any of sensors 12 of FIG. 1, used by one or more remote users.

Network interface 50 provides various interfaces and/or modules that provide the ability to establish direct connections with one or more remote sensors 12. In this manner, visualization control system 18 can automatically interact with sensors 12 and/or systems deployed at various locations. As shown in FIG. 3, network interface 50 may enable visualization control system 18 to communicate over network 14, e.g., with mobile devices 116 and computing device 124.

Application servers 42 provide an operating environment for application software modules 52, which provide the underlying logic and functionality for implementing the various techniques ascribed to visualization control system 18 herein. Message dispatcher 54 receives communications from network interface 40, and issues inbound messages 55A to application software modules 52 to process the communications. In particular, network interface 50 may receive communications from remote devices, and, in turn, forward the communications to message dispatcher 54. Message dispatcher 54 determines the appropriate application software modules 52 for processing each communication, and dispatches one or more inbound message 55A to the identified modules. In a similar manner, application software modules 52 may generate outbound messages 55B to communicate with remote devices over network 14.

Application software modules 52 may include a number of modules including input processing module 62, mapping and display control module 64 and database access module 66. Application software modules 52 interact with database servers 44 to access a number of data stores 68, including configuration data 68A and input data 68B. Data stores 68 may be implemented in a number of different forms including data storage files, or as a database management system (DBMS). The database management system may be a relational (RDBMS), hierarchical (HDBMS), multidimensional (MDBMS), object oriented (ODBMS or OODBMS) or object relational (ORDBMS), or other database management system. Furthermore, although illustrated separately, data stores 68 could be combined into a single database or other data storage structure. Data stores 68 could, for example, be implemented as a single relational database (such as that marketed by Microsoft® Corporation under the trade designation 'SQL SERVER").

In general, configuration data 68A stores various parameters and statistics, such as the number of sensor 12, the pre-defined set of emotions, configuration and layout parameters for graphical display 17, and the like.

Input processing module 62 handles and/or processes receipt and storage of input from individuals 10. For instance, input processing module 62 may receive, as part of inbound messages 55A, an identification of a specific emotion entered by a particular sensor. In turn, input processing module 62 directs database access module 66 to create a record within input data 68B to log the input. The record may, for example, specify: (1) a timestamp for record at which the input was received, (2) the specified emotion, and (3) an identifier for the sensor 12 from which the message was received.

Mapping and display control module 64, in various implementations, operates in accordance with control logic 90 to generate and control graphical displays 17 in real-time for presentation by user interface modules 46. For example, mapping and display control module 64 may create and update a rendering of graphical display 17 of FIG. 2 as input data 68B is received and processed by input processing module 62. In accordance with the techniques described herein, mapping and display control module 64 generates display 17 to provide a visual mapping for individual entries of input data 68B, such as an indicator 26 for each entry within database 68B. In addition, mapping and display control module 64 generates display 17 to provide a visual mapping of group properties, such as the area for each regions 20 based on relative number of entries recorded for each group within a previous time duration. In addition, mapping and display control module 64 generates display 17 to provide a visualization of the temporal dynamics of the emotions of the group, such as by animating indicators 26 so as to control the speed that the indicators traverse regions 22 and the rate at which the indicators appear and are removed, as described herein.

Figure 4:
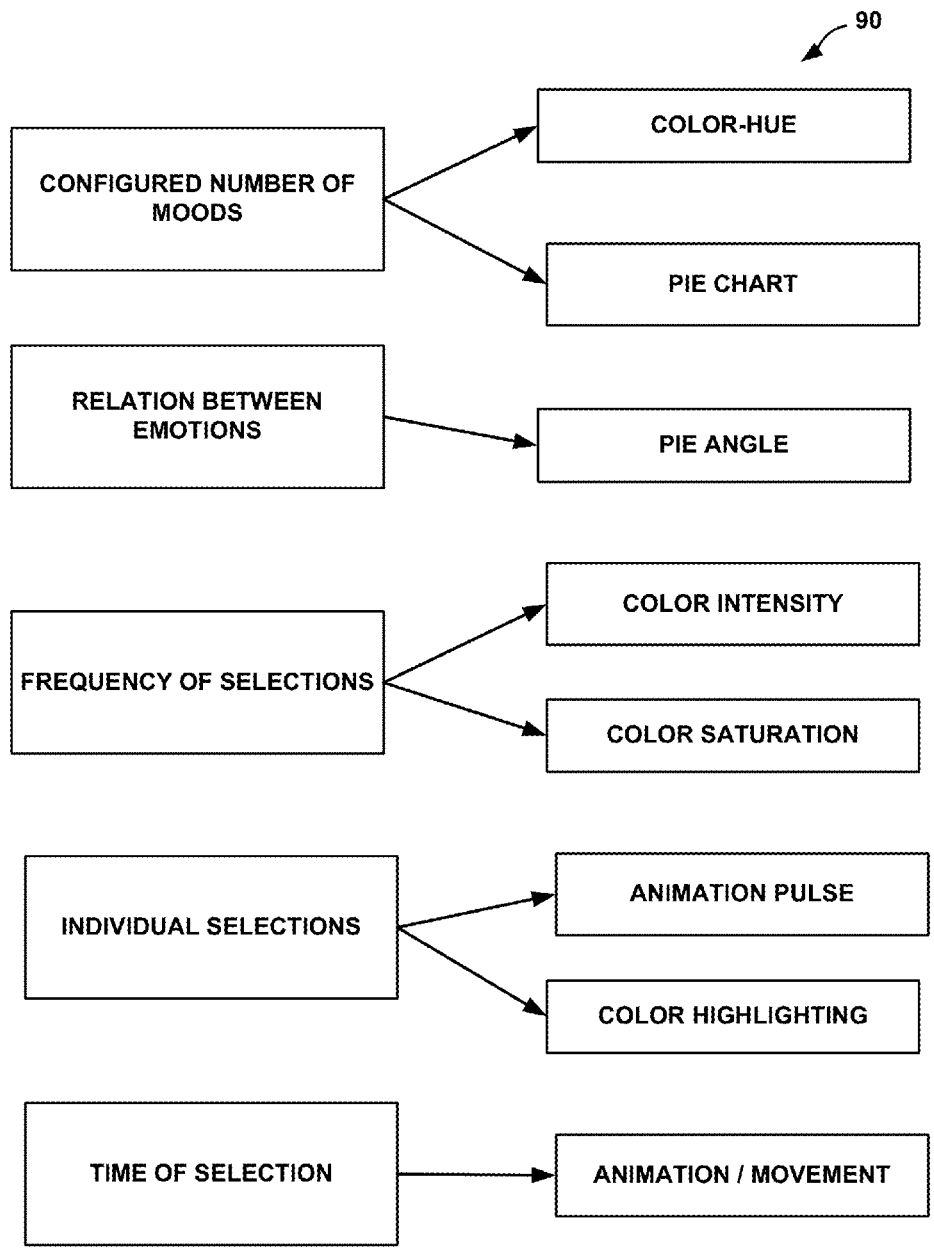
FIG. 4, for example, provides a block diagram illustrating example control logic applied by mapping and display control module in computing and controlling visual characteristics of displays based attributes of input data received from the individuals.

FIG. 4, for example, provides a block diagram illustrating example control logic 90 applied by mapping and display control module 64 in computing and controlling visual characteristics of displays 17 based attributes of input data 68A. For example, mapping and display control module 64 may utilize the configured number of moods as initial input to determine the number of regions, such as the number of wedges within the pie chart example. In addition, mapping and display control module 64 may select and assign a different color hue to each of the regions.

Further, mapping and display control module 64 may compute certain data representative of relations between the emotions, such as by computing the size of each region and angle of each pie wedge, for example, based on the relative number of individuals 10 experience each of the emotions. In addition, mapping and display control module 64 may utilize the frequency at which inbound messages 55A are received for each emotion to control an intensity and saturation of the color assigned to indicators 26 for that particular motion.

Mapping and display control module 64 may, as described, generate displays 17 to highlight new or recent individual selections, such as by pulsing the corresponding indicator 26 or providing a highlight halo around the indicator.

Further, mapping and display control module 64 may generate displays 17 and control the animation of indicators 26 in accordance with the time at which corresponding inbound messages 55A are received.

The techniques described in this disclosure may be implemented, at least in part, in hardware, software, firmware, or any combination thereof. For example, various aspects of the described techniques may be implemented by software executed by one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Various aspects of the disclosure have been described. These and other aspects are within the scope of the following claims.

The invention claimed is:

1. A computer-implemented method comprising:
    generating, by a computing device, a graphical display having a plurality of regions, each of the regions representing a different one of a plurality of emotions;
    receiving, by the computing device, input from each of a plurality of computing devices of different individuals, wherein the input received from each of the computing devices of the different individuals is indicative of an emotion of the individual from which the input was received;
    as the input is received, outputting, by the computing device, a set of indicators in each of the regions of the graphical display, wherein each of the indicators represents a different one of the individuals who is experiencing the emotion associated with the region in which the indicator is displayed and is displayed with a color assigned to the emotion; and
    animating, by the computing device, the indicators to move the indicators within the regions and removing the indicators after a time duration to depict a current mood for each of the individuals within the context of the overall group of individuals.

2. The method of claim 1,
    determining a respective frequency at which input is received for each of the emotions; and
    controlling the time duration that the indicators are displayed within each of the regions as a function of the determined frequency for the emotion represented by the region of the graphical display.

3. The method of claim 2, wherein controlling the time duration further comprises:
    controlling, as a function of the determined frequency for the emotion represented by each of the regions, a rate at which the indicators move within each of the regions and the time duration at which the indicators are output by the graphical display before removal.

4. The method of claim 3, wherein animating the indicators comprises:
    moving each of the indicators at a controlled speed such that each of the indicators travels across a respective one of the graphical regions and reaches a center of the graphical display over the time duration; and
    removing the indicators when the indicators reaching the center of the graphical display.

5. The method of claim 4, further comprising displaying an indicator with a highlight to represent that the indicator corresponds to an individual from which input was most recently received with respect to other indicators presented by the graphical display.

6. The method of claim 1, wherein displaying a set of indicators comprises displaying a corresponding indicator for each input received from the individuals.

7. The method of claim 1, further comprising:
    computing a number of inputs received over a time duration for each of the emotions; and
    dynamically updating, in real-time as the inputs are received, a size of each of the regions of the graphical display based on the number of inputs received over the time duration for the emotion represented by the region.

8. The method of claim 1, wherein generating a graphical display having a plurality of regions comprises generating the display as a pie shape having a plurality of wedge-shaped regions that each correspond to a different one of the emotions.

9. The method of claim 1,
    wherein generating a graphical display having a plurality of regions comprises generating the display to depict a river having a plurality of water bands as regions that each correspond to a different one of the emotions, and
    wherein outputting a set of indicators in each of the regions of the graphical display comprises outputting the indicators as graphical fish within the water bands.

* * * * *